Oct. 14, 1941.   W. B. KOCHNER   2,258,987
MOTOR FRAME CONSTRUCTION
Filed May 29, 1940
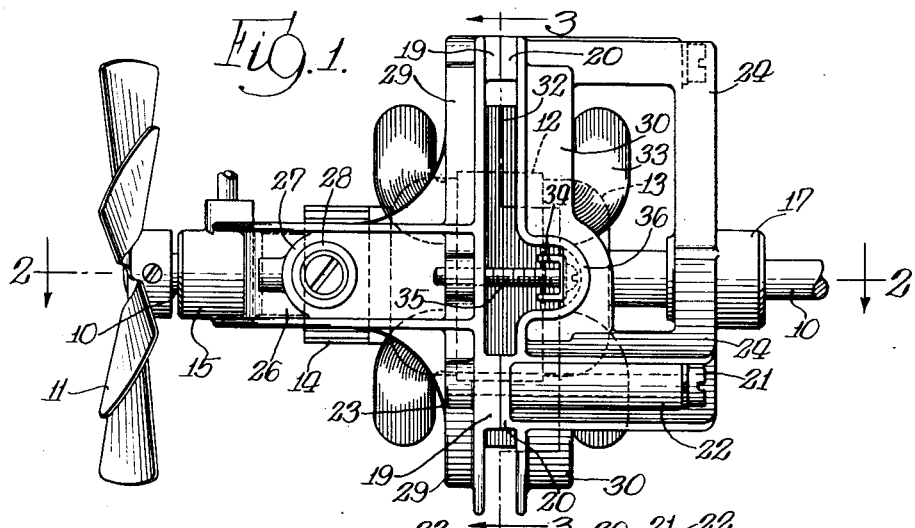
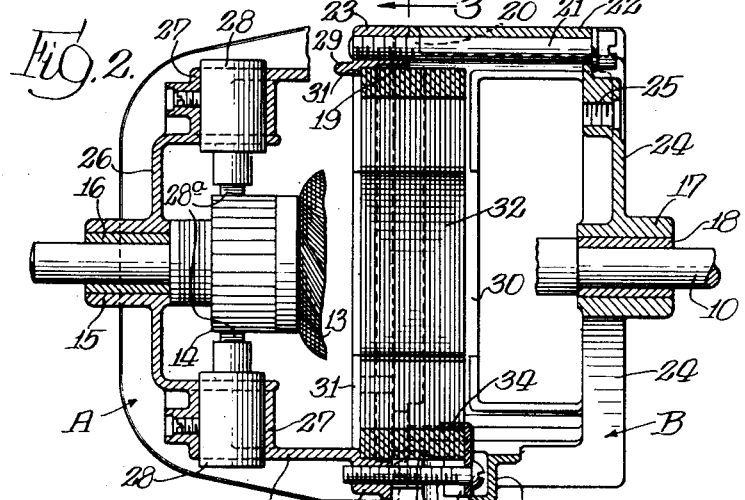
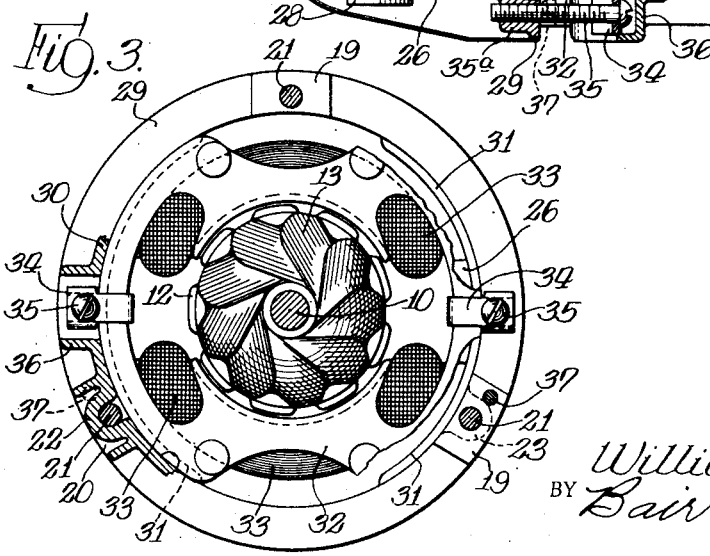
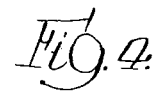
INVENTOR.
William B. Kochner
BY Bair & Freeman
Attys.

Patented Oct. 14, 1941

2,258,987

UNITED STATES PATENT OFFICE 2,258,987

MOTOR FRAME CONSTRUCTION

William B. Kochner, St. Louis, Mo., assignor to Knapp-Monarch Company, St. Louis, Mo., a corporation of Missouri Application May 29, 1940, Serial No. 337,810

5 Claims. (Cl. 172—36)

My present invention relates to a frame construction for electric motors or the like wherein a pair of frame members are so associated with each other that their bearings are accurately aligned.

One object of the invention is to provide a pair of frame members in the form of die castings or the like which are assembled together and their motor shaft bearings aligned with each other, irrespective of the usual stack of field laminae surrounding the motor shaft.

A further object is to provide a pair of frame members wherein a stack of field laminae are secured to one of the frame members only and the frame members being provided with three pads constituting three points of engagement with each other which, when frame member assembling screws are inserted, accurately align the motor shaft bearings after the field laminae have been assembled with respect to the one frame member.

Still a further object is to provide clamp clips and clamp screws for securing the field laminae to the one frame member, the other frame member having an annular portion surrounding the field laminae and provided with offsets to accommodate the clamp clips and clamp screws.

Other objects, purposes and characteristic features of the present invention will be in part obvious from the accompanying drawing and in part pointed out as the description of the invention progresses. In describing the invention in detail, reference will be made to the accompanying drawing in which like reference characters designate corresponding parts throughout the several views, and in which—

Figure 1 is a plan view of a motor embodying my motor frame construction;

Figure 2 is a sectional view thereof on the line 2—2 of Figure 1;

Figure 3 is a sectional view on the line 3—3 of Figure 1, with parts of the field laminae broken away to show a shoulder against which the stack of field laminae are positioned, and Figure 4 is a perspective view of a clamp clip used in mounting the field laminae relative to my motor frame construction.

On the accompanying drawing I have used the reference numeral 10 to indicate a motor shaft. The usual armature having laminae 12, windings 13 and a commutator 14 is mounted on the shaft 10. My frame construction comprises a pair of frame members indicated in general at A and B. The frame member A has a boss 15 supporting a bearing 16 for the motor shaft 10. The frame member B has a corresponding boss 17 provided with a motor shaft bearing 18. A cooling fan 11 may be mounted on the shaft 10.

The frame member A is provided with three contact pads 19 and the frame member B is provided with three companion contact pads 20. The pads 19 and 20 are adapted to contact with each other and to be assembled in such position by elongated screws 21 extending through bosses 22 of the frame member B and threaded into bosses 23 of the frame member A. The bosses 22 are also elongated so that the frame member B (preferably made of die-cast metal) is thereby substantially reinforced. The frame member B has three spokes 24 radiating from the hub 17 to the bosses 22 and these may be threaded as at 25 for receiving mounting screws whereby the motor frame is supported at one end only. Most of the strain of support is therefore on the one frame member B, and hence the need for reinforcement by the elongated screws 21 which are preferably of steel.

The frame member A has a pair of spokes 26 provided with hubs 27 receiving brush holders 28. Brushes 28ª are supported by the brush holders 28 and contact with the commutator 14 in the usual manner.

Each of the frame members A and B is provided with an annular reinforcing portion indicated at 29 and 30, respectively. The annular or ringlike portion 29 connects the three pads 19 together, while the portion 30 connects the pads 20 together, thus reinforcing the pads against dislocation with respect to each other. The spokes 24 and 26 are then, in effect, yokes connecting different parts of the ringlike members 29 and 30 together. The ringlike member 29 of the frame member A is provided with a broken annular shoulder or flange 31 adapted to serve as a seat for a stack of field laminae 32. The field windings wound thereon are indicated at 33.

The laminae 32 are connected to the frame member A only by means of clamp clips 34 and clamp screws 35. The screws 35 enter threaded bosses 35ª of the ring member 29. The ring member 30 in conjunction with the ring member 29 then enclose the laminae 32 with clearance provided between the ring member 30 and the laminae, so that they do not in any way affect the alignment of the frame member B with respect to the frame member A. The ring member 30 for this purpose is provided with an offset portion 36 to clear the clamp clip 34 and the clamp screw 35.

My disclosed type of motor frame construction eliminates the possibility of the motor shaft bearings being out of alignment with each other, as when the frame members are clamped against opposite sides of the stack of field laminae as in usual motor construction. The field laminae are supported by one of the frame members only and the other frame member any time it is assembled relative to the first frame member will always have its bearing accurately aligned with the bearing of the first frame member. This is due to the three point contact at 18—20 and the contact pads may be provided with dowel pins, indicated at 37 in Figure 3, to accurately locate them relative to each other. They can be thus assembled together and the bearings 16 and 18 reamed out and then the frame members disassembled for receiving the armature and field laminae and windings, after which reassembly can be had with assurance that the bearings will be properly aligned. The motor frame construction furthermore is so designed that with a minimum of metal the maximum of rigidity of construction is secured, with ample reinforcement so that the entire motor can be supported from one end only.

From the foregoing description of the means for accomplishing this end it is apparent that I have devised a practical and efficient construction for carrying out the desired objects of the invention as regards a simple and economical unit of the character described, and while the foregoing represents one of the preferred forms of embodiment of the invention, I desire to reserve the right to make whatever changes or modifications may fairly fall within the scope of the appended claims.

What I claim as new and desire to secure by Letters Patent of the United States is:

1. In a motor frame construction, a pair of frame members, means to connect said frame members together, a motor shaft bearing carried by each of said frame members, said bearings being aligned with each other when said frame members are so connected together, a pile of field laminae enclosed within said frame members, one of said frame members having a seat against which one side of said pile of laminae engage, perforated projections from the opposite side of said pile of laminae, and tie bolts extending along and exteriorly of the periphery of the laminae and extending through said projections to connect them with said last mentioned frame member to retain said laminae against said seat.

2. In a motor frame construction, a pair of frame members having three points of contact with each other, means to connect said frame members together adjacent said contact points, a motor shaft bearing carried by each of said frame members, said bearings being aligned with each other when said frame members are so connected together, a pile of field laminae, one of said frame members having shoulders against which one side of said pile of laminae engage, clamp clips comprising a plate and flanges from the edges thereof, said plates engaging the opposite side of said pile of laminae and its flanges engaging the inner and outer edges thereof, and screws through said clamp clips, along the sides of the pile of laminae and into said one of said frame members to retain said laminae assembled and in engagement with said shoulders.

3. In a motor frame construction, a pair of frame members having three points of contact with each other, means to connect said frame members together adjacent said contact points, a motor shaft bearing carried by each of said frame members, said bearings being aligned with each other when said frame members are so connected together, said frame members each having an annular element connecting its three points of contact together, a pile of field laminae, one side of which engages one of said frame members, clamp clips embracing the opposite side of said pile of laminae, and screws exterior of said laminae and through said clamp clips and into one of said frame members to clamp said laminae thereagainst, the annular element of said other frame member having offset portions to clear said clamp clips and screws.

4. A motor frame construction comprising a pair of ring-like frame members each having a yoke, a bearing supported in each yoke, each frame member having three contact pads, the contact pads of one frame member being positioned against the contact pads of the other frame member, screws through one of said frame members and into the other at said contact pads to retain said frame members in assembled relation to each other with said bearings aligned with each other, said frame members having elongated bosses through which said screws extend whereby the screws reinforce the frame members, a stack of field laminae, said frame member having shoulder means against which said laminae are secured, means for so securing said laminae to said one of said frame members only comprising clamp clips on the side of the stack of laminae opposite the side thereof engaging said shoulder means, and clamp screws exterior of the laminae for drawing said clamp clips and frame member toward each other, the other frame member having offset portions to clear said clamp clips and clamp screws.

5. In a motor frame construction, a pair of frame members comprising ring-shaped elements and yoke elements, means to connect said frame members together, motor shaft bearings carried by said yoke elements of said frame members, said bearings being aligned with each other when said frame members are so connected together, a pile of field laminae enclosed within said ring-shaped elements, one of said elements having shoulder means against which one side of said pile of laminae engages, means for clamping said pile of laminae thereagainst, the annular element of said other frame member having offset portions to clear said clamping means.

WILLIAM B. KOCHNER.